MAGNETIC CORE REGISTER CIRCUITS

Filed Dec. 12, 1956 3 Sheets-Sheet 1

INVENTOR
N. D. NEWBY
BY R. C. Terry
ATTORNEY

INVENTOR
N. D. NEWBY
BY R. C. Terry
ATTORNEY

FIG. 4
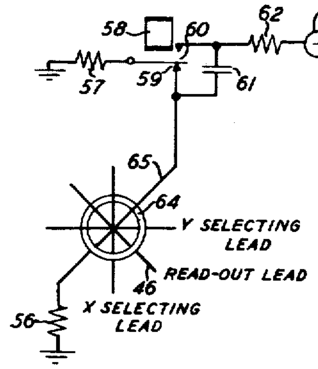
FIG. 7, FIG. 5
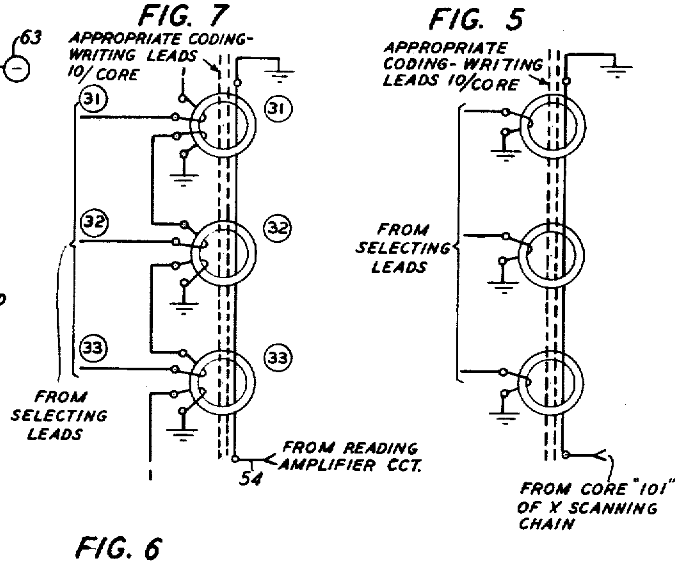
FIG. 6
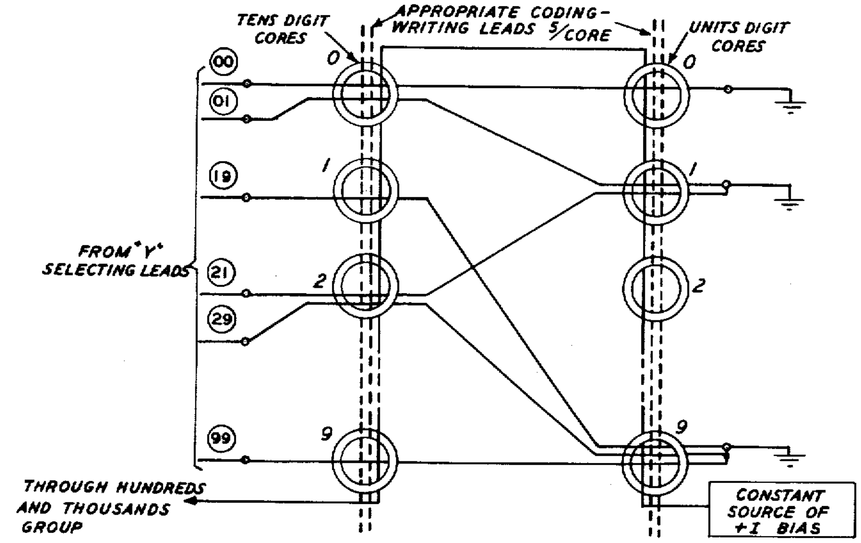
FIG. 8
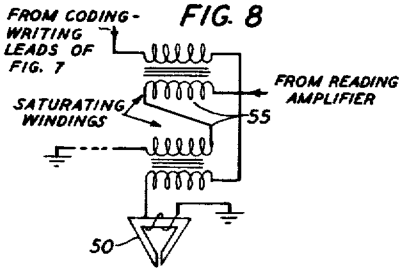
FIG. 9
| DECIMAL | 2/5 REPRESENTATION | | | | |
|---|---|---|---|---|---|
| | 0 | 1 | 2 | 4 | 7 ← BIT |
| 1 | 1 | 1 | 0 | 0 | 0 |
| 2 | 1 | 0 | 1 | 0 | 0 |
| 3 | 0 | 1 | 1 | 0 | 0 |
| 4 | 1 | 0 | 0 | 1 | 0 |
| 5 | 0 | 1 | 0 | 1 | 0 |
| 6 | 0 | 0 | 1 | 1 | 0 |
| 7 | 1 | 0 | 0 | 0 | 1 |
| 8 | 0 | 1 | 0 | 0 | 1 |
| 9 | 0 | 0 | 1 | 0 | 1 |
| 0 | 0 | 0 | 0 | 1 | 1 |
INVENTOR
N. D. NEWBY
BY R. C. Terry
ATTORNEY 3,061,818

MAGNETIC CORE REGISTER CIRCUITS

Neal D. Newby, Leonia, N.J., assignor to Bell Telephone Laboratories, Incorporated, New York, N.Y., a corporation of New York Filed Dec. 12, 1956, Ser. No. 627,858
31 Claims. (Cl. 340—172.5)

This invention relates to registering circuits and, more particularly, to magnetic core registering circuits for permanently recording information.

Currently, there is an increasing demand for storage and registering circuits capable of handling large quantities of two-valued information. The source of this demand is primarily the computer art. In addition, industries such as the telephone industry find great need for this type of circuit to aid in determining the frequency and periods of use of their equipment by individual customers. The telephone industry, for example, is interested in determining how often particular customers' lines are utilized. Because such information may be characterized by "line in use" or "line not in use," and is of a bivalued nature, a register of the type mentioned may advantageously be utilized. There is also a necessity for simultaneously registering information concerning large numbers of independent circuits, as for instance information concerning the use of a plurality of individual telephone lines.

An object of the present invention is the provision of a registering circuit capable of simultaneously registering information of a bivalued nature concerning the state of a plurality of two-state circuits.

Many present day registering devices, for instance groups of electronic flip-flops and banks of relays, provide only a semi-permanent indication of the information registered. The output of these registers is not in a form readily adaptable for use in controlling additional equipment, nor is it in a form which may be permanently stored. A familiar remedy to alleviate these disadvantages is the translation of the information stored into an easily interpreted visual form, and for a permanent record this visual information may be photographed. With an arrangement of this nature there is still a need for human supervision of the operations. It is obviously advantageous to have the output of a registering circuit in a form that may be conveniently stored for indefinitely long periods of time and that may be utilized to control the operation of automatic equipment. One method of achieving this objective is to place the information on a medium such as magnetic or punched tape.

Another object of the present invention is the provision of an improved registering circuit in which the output is in a permanent, easily stored, and easily utilized form.

The substitution of automatic for human monitoring and registration of changing circuit states permits the realization of many desirable objectives. Well designed automatic equipment may be operated for longer hours, at less expense, and with fewer errors than comparable manual equipment controlled by human operators. Of course, to obtain the maximum benefits available from automatic equipment, maximum life and durability are sought.

Another object of the present invention is the provision of a registering circuit which is rapid, accurate, efficient, durable, and economical.

When a large number of circuits are controlling a register, there is a very high probability of a change of state appearing simultaneously in a plurality of the controlling circuits. In order to insure accurate registration of all information it is therefore necessary that the register be capable of receiving information in a parallel or simultaneous fashion. Once the information has been received, there is no great need for immediate permanent recording, because the period between changes in the state of any one circuit will generally be considerable where uses such as those previously ascribed to the telephone industry are concerned. These facts permit consideration of such permanent recording means as magnetic tape, punched tape, magnetic drums, etc., which means may most effectively be fed information in a serial or sequential fashion. Taking advantage of the aforementioned facts, this invention employs a temporary storage means characterized by an ability to simultaneously receive information from a plurality of circuits and to transmit the information received to a permanent recording means in a sequential fashion.

In the prior art, the storage of bivalued information was facilitated by the utilization of electronic circuits such as the familiar flip-flop and by such mechanical devices as the well-known relay. These means all suffer the disadvantages of relatively short life and of complete loss of information in the event of power failure. The contemporary art has demonstrated that the proper utilization of magnetic cores in a variety of circuits can provide systems devoid of many of the disadvantages experienced in circuitry using electronic flip-flops and electromechanical relays.

A further object of the present invention is the provision of an improved registering circuit which permanently records information temporarily stored in magnetic cores.

A magnetic core storage system frequently encountered in the art employs cores arranged in a matrix comprising rows and columns. A plurality of row selecting leads or windings are inductively coupled to each core in a given row and a similar plurality of column selecting leads or windings are inductively coupled to each core in a given column. A familiar method of obtaining this inductive coupling is to employ toroidal magnetic cores and threading the selecting leads through their circular apertures. In addition to threading, on occasion the leads may be wound around the core several times to obtain the desired ampere turn value. Each core may also be inductively coupled to an individual "set" winding which is externally connected to the equipment that is to store information in the matrix, and generally, further coupled to each core of the matrix is a read-out lead or winding in which a voltage is induced whenever any one of the cores is switched. The type of magnetic cores generally employed are those having substantially rectangular hysteresis loops. Such cores are commonly said to have two states of magnetic saturation, one of which may be called the "P" state and the other the "N" state. A prominent property of such cores is their capability of remaining in a given state of saturation for an indefinitely long period without reliance upon any external source of power.

In a typical operation of a magnetic core matrix, all of the magnetic cores will initially be set to one polarity, for instance, the N polarity. The cores in which information is to be placed are then switched to the P polarity. In order to determine which cores contain information, a scanning operation is performed. This operation consists of simultaneously pulsing one row selecting lead and one column selecting lead with a current pulse of magnitude equal to one-half that required to switch a matrix core from a P to an N state. The core at the intersection of these leads is therefore subjected to a current pulse sufficient to switch it to the N state if it had been set to the P state by its set winding, whereas all of the other cores are subjected only to a pulse of insufficient amplitude to effect the state in which they reside. In the event that the selected core is switched, a voltage will be induced in the read-out lead indicative of the switching action. It is then known that a bit of information was stored in the core. The problem now arises as to which core was being scanned when the read-out pulse was generated, since the read-out lead may be energized by any core in the matrix. Of course, the value of the indication that a core had information stored therein is directly dependent upon the knowledge of which matrix core was set. Heretofore it has been necessary to rely upon the time of occurrence of the voltage pulse induced on the read-out lead in relationship to the timing of the scanning operation. This has made necessary the provision of costly and complicated timing and counting circuits. The problem is further complicated by the fact that the read-out operation returns the selected core to its initial state (N, as assumed above) and hence the information stored therein is erased and a recheck is impossible.

A still further object of the present invention is the provision of a registering circuit containing a magnetic core matrix wherein the cores containing information are more readily and reliably detected.

Inasmuch as the information obtained from systems of the nature hereinbefore discussed may very well be used for billing purposes and other purposes of similar importance, it is essential that maximum reliability is maintained. A very effective way of ensuring maximum reliability is the provision of convenient and efficient checking means.

An object of the present invention is the provision of a registering device which may be easily and conveniently checked for correct operation.

The present invention is therefore an improved registering circuit wherein the aforementioned objects are attained. Basically the invention resides in the novel utilization of a magnetic core memory matrix, a pair of magnetic core coding chains uniquely arranged to accurately designate in coded form the location of each core in the matrix, and a permanent recording means controlled by the voltages produced in coding chains and the switching voltage produced when a scanning operation detects a matrix core previously set by input circuitry.

The above and other objects of the present invention are attained in the illustrative embodiments described hereinafter wherein a plurality of magnetic cores termed coding-writing cores are inductively coupled in accordance with a predetermined code to the row and column selecting leads of a magnetic core matrix. These coding-writing cores are switchable to produce switching voltages upon the energization of the particular row and column selecting lead or leads coupled thereto, thereby providing a positive indication of which of the selecting leads were energized and hence which matrix core was scanned. The switching voltages produced by the switching of the coding-writing cores are utilized in combination with derived pulses on the read-out lead of the matrix to control a permanent recording device to record in coded form, the designation of each core of the matrix which was set. The designation of each set core of the matrix is therefore recorded by the permanent recording device in response to the scanning of the core.

More specifically, in accordance with this aspect of the present invention and as disclosed in two illustrative embodiments thereof, the designation of each core of the matrix is recorded on a movable magnetizable medium in response to the scanning of the core. Each successive core designation recorded on the medium is effective to erase the previously recorded core designation. When a scanned core has been previously set by input circuitry however, the pulse produced on the read-out lead as a result of the scanning operation will control a driving means to move the magnetic medium and prevent the core designation of the set core recorded on the medium from being erased by the succeeding core designation recorded thereon. Thus the designation of each set core of the matrix is permanently recorded immediately on the magnetic medium when the core is scanned and therefore the designations of all matrix cores set by the input circuitry are permanently recorded on the magnetizable medium after completion of scan of the entire matrix.

In a third illustrative embodiment of the present invention the recording of the core designation of each core of the matrix which was previously set by the input circuitry is controlled by a gate operated in response to pulses on the read-out lead. In this embodiment of the present invention, the switching voltages produced by the coding-writing cores are blocked from the recording device until a pulse on the read-out lead of the matrix occurs indicating that the scanned matrix core was previously set. This pulse on the read-out lead controls a gate which then closes a path to the recording device for the switching voltages produced by the coding-writing cores. Therefore, in this embodiment only the core designation of the matrix cores previously set by the input circuitry will be recorded on the magnetizable medium in response to the scanning of the set cores.

Accordingly, it is a feature of the present invention to record the designation of each core of a magnetic core matrix previously set by input circuitry in response to the scanning of the cores of the matrix, thereby providing an immediate and permanent record of the state of each core of the matrix after each scan thereof.

More specifically, it is a feature of the present invention to successively record the designations of each core of a magnetic core matrix in response to the successive scanning of each of said cores, each successively recorded designation erasing the previously recorded designation except when the previously recorded designation corresponds to a core of the matrix previously set by input circuitry.

It is also a feature of the present invention to control the recording of the designations of cores of a magnetic core matrix in response to signal pulses induced in a read-out lead by the scanning of said cores.

In another aspect, the present invention discloses the coding-writing cores inductively coupled to the row and column selecting leads of a magnetic core matrix and further inductively coupled in accordance with a predetermined code to a plurality of coding-writing leads which terminate in a permanent recording means. The switching of the coding-writing cores, as described above, in response to the scanning of the matrix cores thereby induces switching voltages in predetermined ones of the coding-writing leads to encode the designations of the matrix cores and to control the recording of these codes by the recording means.

Another feature of the present invention is a novel arrangement of magnetic cores for encoding the designation of each core of a matrix of magnetic cores.

Because the permanent recording of a designation of each core in a matrix of cores on a recording medium may possibly require a slightly longer interval of time than the actual scanning of the core, it is advantageous to stop the scanning of the cores of the matrix during such permanent recording.

Accordingly, still another feature of the present invention relates to means in a registering circuit containing a magnetic core matrix for discontinuing the scanning of the matrix during the permanent recording of the designation of the matrix cores previously set by input circuitry.

Other objects and feattures as well as a fuller understanding of the invention may be had by referring to the following description and claims taken in conjunction with the accompanying drawing in which:

FIG. 4 is a circuit schematic of a typical core of the matrix in FIG. 1, showing circuit means for setting the core to a given state of magnetic polarity;

FIG. 5 is a circuit schematic of several typical magnetic cores in the coding-writing chain employed in one illustrative embodiment of the present invention;

FIG. 6 is a circuit schematic of several typical magnetic cores employed in the coding-writing chain of a second illustrative embodiment of the present invention;

FIG. 7 is a circuit schematic of several typical magnetic cores employed in the coding-writing chain of a third illustrative embodiment of the present invention;

FIG. 8 shows schematically, a saturable reactor employed in the permanent recording portion of the third illustrative embodiment; and FIG. 9 is a chart showing the conversion from the decimal system to a 2-out-of-5 binary representation as employed in this invention.

Figure 1:
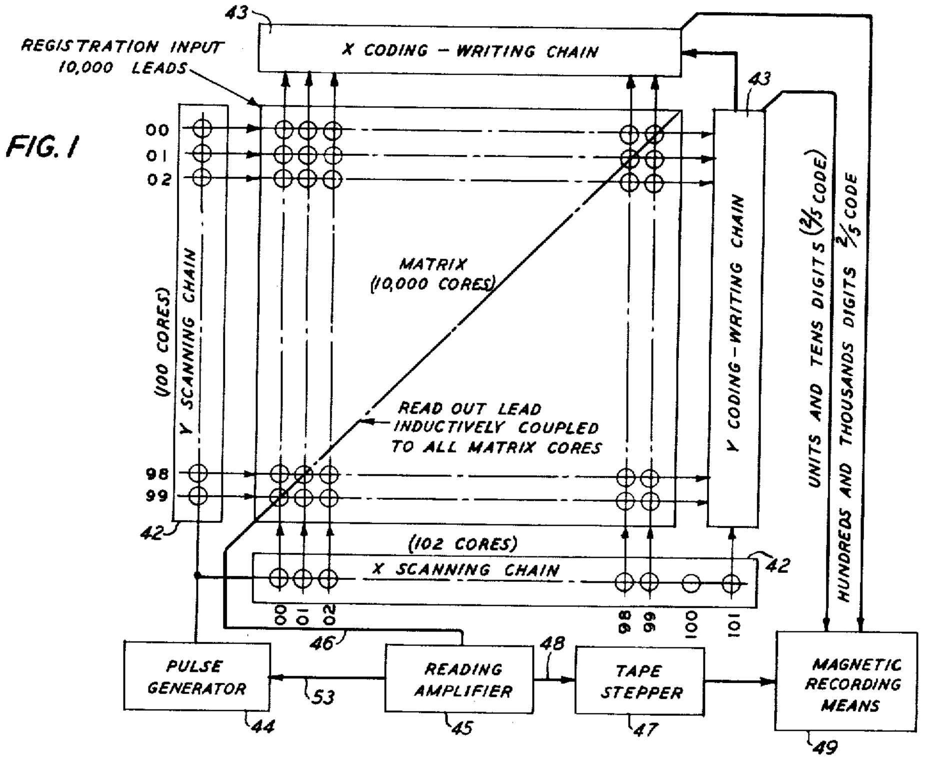
FIG. 1 is a schematic representation of the basic components employed in an illustrative embodiment of the present invention and their interrelationships.

Referring now to the drawing, FIG. 1 illustrates in block form an illustrative embodiment of the invention. As will be apparent from a perusal of this figure the embodiment to be discussed hereinafter is capable of keeping under surveillance circuitry composed of ten thousand separate lines. These lines may exhibit two different circuit states, for instance, an active state and an inactive state, and a change in state of any circuit will be apparent by the appearance of a pulse on the line associated with the particular circuit concerned. This pulse will be employed to set cores in the matrix to a state of P saturattion, it being assumed that the normal state of saturation is N.

Considering FIG. 1 specifically, it will be noted that it comprises a magnetic core matrix containing ten thousand cores. These cores are arranged in rows and columns and disposed throughout a single plane. Although this arrangement is employed in the illustrative embodiments of this invention, there is no intention to thereby limit the scope of the invention. A three-dimensional matrix may also advantageously employ the features of this invention. FIG. 4 illustrates in detail a typical core 64 of the ten thousand cores in the matrix of FIG. 1 and shows the four separate windings or leads inductively coupled thereto. Two of these leads, the X selecting lead and the Y selecting lead, are coupled to all of the cores in a given column or a given row of the matrix. A third lead 65 is associated with each circuit under surveillance and serves as the input to the core, causing it to switch to a P state when information is to be registered. The fourth winding or lead 46 is inductively coupled to each core of the matrix and is commonly designated the read-out lead. This lead detects the presence of information in each matrix core by having pulses induced in it whenever scanned cores are switched from the P to the N state.

During operation of a magnetic core register of the type shown in FIG. 1, if a matrix core is scanned at the same instant that information is being stored therein, the core is subjected to two currents. Assuming a normal magnetic saturation in the N state, the information pulse will tend to switch the matrix core to a P state while the scanning pulse tends to maintain the core in the N state. Scanning therefore may prevent the state of the core from being changed and the information may be lost. A well-known expedient to prevent loss of this information is to provide a longer information pulse than the scanning pulse. An additional factor to be considered when storing information in a magnetic core matrix is the voltage which may be induced in the common read-out lead due to the setting of a core of the matrix. The common read-out lead is frequently threaded through each core of the matrix with alternating polarity to reduce the accumulation of unwanted voltage effects. With this arrangement the voltage induced by adjacent cores will have opposite polarity. This being true, storing information in the matrix cores and scanning the core in which such information has been stored both produce voltages in the common read-out lead and the detection equipment may not be able to distinguish between them, or two such voltages may cancel one another. A known means of alleviating this condition is to reduce the rise time of the "set" or information pulse so that no appreciable output pulse is generated. Another known means of alleviating the condition is to completely stop the scanning during information storage. The loss of time incurred by such operation in the great majority of cases is negligible. Either of these techniques may be employed in the present invention.

Inasmuch as the circuitry to be kept under surveillance by the register of the present invention, illustrated in FIG. 1, will in many instances be composed of relay devices, a still further difficulty may be encountered in setting matrix cores to the desired polarity. This difficulty is attributable to the phenomenon of contact chatter or bounce. With a magnetic core storage system, as herein proposed, a signal might be stored in a core by the first contact closure and immediately thereafter read out restoring the core to normal during the following opening. The subsequent reclosure would then record a false signal in the core. A method of overcoming this difficulty is shown in FIG. 4. Because the matrix core requires only a short pulse to set it, protection against chatter may be obstained by the employment of a capacitor and several resistors, the values for which are determined by the time constants desired.

In FIG. 4, relay 58 represents any typical relay the operation of which is to be recorded, lead 65 represents any one of the ten thousand registration input leads indicated in FIG. 1, and core 64 is any typical matrix core of the ten thousand therein depicted. Position 59 of the relay armature will be considered the open or inactive position whereas position 60 will be the closed or operated position. Because the applications of this register in the telephone industry have been previously discussed, battery 63 has been poled to provide a negative source such as might be encountered in such use; however, a reversal of polarity would only affect the polarity of the ultimate saturation of core 64. The remaining circuit components are chosen so that the time constant of capacitor 61 discharging through resistors 56 and 57 is relatively small so that capacitor 61 is substantially discharged on the first contact closure; and the time constant of resistor 62 and capacitor 61 in combination is relatively long so that only a very small charge can be stored in the capacitor during the longest open due to contact chatter, but small enough to permit the capacitor to be substantially fully charged between relay operations. Thus, the first contact closure causes capacitor 61 to discharge through resistors 56 and 57 setting core 64. Subsequent opening due to contact chatter tends to recharge capacitor 61 but the time constant of the charging circuit is large, therefore very little charge is stored before the next closure. When the next closure due to contact chatter occurs, any discharge current that does flow is insufficient to affect the setting of core 64.

In order to conveniently locate each core in the matrix, an address or core designation has been assigned to each core. Considering first the Y or vertical coordinate, the address of each row starting at the top and descending is a two-digit decimal number starting with 00 and ending with 99 as shown in the figure. The X coordinate has a similar designation starting with the column on the extreme left designated 00 and extending to the right terminating in column 99. A matrix core is designated by the combination address of the row and column intersecting at its location, the row address coming first. Each core, therefore, is designated by a four-digit number.

The stepping or scanning chains 42, located on the extreme left and directly below the matrix as illustrated in FIG. 1, are employed to scan the entire matrix in order to determine which cores contain information. These stepping chains are composed of magnetic cores and scan the matrix in a diagonal pattern, scanning all of the matrix cores in each diagonal before moving to the next. A detailed description of the operation of these chains is provided hereinafter.

The coding-writing chains 43 disposed across the upper and right-hand edges of the matrix, as illustrated in FIG. 1, serve to translate the location of each scanned matrix core into a binary code designation and impress this information on a permanent recording means. In the following discussion three different illustrative embodiments of the invention will be described; each of these embodiments utilizes a different coding-writing chain. All of these chains translate the core address to a 2-out-of-5 code which is then permanently recorded. This means that twenty bits of information are required to represent the four digits of each matrix core address.

At the extreme base of FIG. 1 is shown a pulse generator 44 for controlling the matrix scanning operation, a reading amplifier 45 directly connected to the read-out lead 46 for conditioning the output pulses to enable them to perform specific functions, a tape stepper 47 controlled by the reading amplifier 45, via lead 48, for stepping the magnetic tape utilized in the illustrative embodiments of this invention, and a magnetic recording means 49 controlled by the tape stepper 47 and the coding-writing chains 43. For illustrative purposes, a magnetic tape recorder has been chosen to fulfill the functions of permanent recording. However, other means will immediately be apparent to those skilled in the art; for instance, magnetic drums or punched tape recorders. The utilization of 2-out-of-5 binary code and the subsequent need for twenty bits of information dictate the use of twenty magnetic recording heads when magnetic tape recording is employed.

Scanning the matrix consists of pulsing each matrix core with a current pulse capable of switching the core to an N state. In the invention these scanning pulses are generated by stepping chains such as those illustrated in FIG. 2. Two separate chains are utilized, one for supplying pulses to the leads threading each column of matrix cores, and the other for supplying pulses to the leads threading each row of matrix cores. Actually, FIG. 2 may be considered as containing two separate and distinct portions of circuitry for performing related but different operations, the first operation being the continuous production of alternate pulses on two pairs of leads and the second operation being the production of actual scanning pulses. Clearly, the first operation is performed by pulse generator 44 and the second operation is performed by scanning chains 42. The application of pulses to alternate leads is made possible by the use of multivibrator 11, blocking oscillators 12, 13, gate 14, vertically depicted magnetic cores 15, 16, 17, and 18, and associated circuitry. The circuitry connected with each core includes the following elements, which will be mentioned only with respect to core 15, which is typical: an input winding 19 serially connected to blocking oscillator 12 and winding 27 which is similarly wound on core 16, switching winding 20, output winding 21, and transfer winding 22. Transfer winding 22 is connected through diode 23 to switching winding 26 of core 16 by way of a circuit including shunt capacitor 24 and inductor 25. The transfer winding of core 16 is identically connected to the switching winding 20 of core 15. Multivibrator 11 continuously produces pulses that trigger blocking oscillators 12 and 13, the output of blocking oscillator 12 energizing input windings 19 and 27 of cores 15 and 16. When a core (for instance core 15) is initially in a state of positive magnetic saturation, P, the pulses produced by the blocking oscillator will switch this core to a negative magnetic saturation state, N. The voltage produced in the transfer winding 22 by this switching will be of a positive nature and therefore will pass through diode 23 charging capacitor 24. Subsequent discharge of capacitor 24 is delayed by the presence of inductance 25. Upon termination of the input pulse, capacitor 24 discharges through switching winding 26 and inductance 25, the parallel path comprising transfer winding 22 and diode 23 being inaccessible due to the polarity of diode 23. This discharge current passes through switching winding 26 in a direction designed to switch the second magnetic core 16 from an N to a P state. The following input pulse from blocking oscillator 12 can now effect only core 16, because the core 15 is now in an N state, switching core 16 from P to N. This switching, by the same steps above described, produces a pulse in winding 28 which, through circuitry comprising a diode, a capacitor, and an inductance will switch the original core 15 from an N to a P state. It is seen, therefore, that successive input pulses alternately switch cores 15 and 16. The output windings 21 and 29 on each of these cores are connected through diodes 30 and 31 respectively to windings on alternate cores of the X scanning chain. The lead associated with grounded winding 21 is connected to the anode of diode 30 and thence, from the cathode thereof, to windings on each odd numbered core in the chain, returning to ground. The lead associated with grounded winding 29 is connected to the anode of diode 31 and thence, from the cathode thereof, to windings on each even numbere core in the scanning chain ultimately to end in a second ground connection. Thus, every time one of the cores 15 or 16 is switched, a pulse is applied to all of the odd or all of the even cores in the scanning chain.

Momentarily considering the scanning chains without reference to the driving pulses just mentioned, their action when alternate pulses are produced upon the driving windings will be described. In the illustrative embodiments of this invention one core in the chain will be in state P, all others in state N. Actually, in a general case any number of cores in any pattern desired may be in state P with the limitation that two adjacent cores may not be in state P. The pulses applied upon the input leads are of the polarity required to change the cores from state P to state N; therefore, the only core whose state will be changed by an input pulse is the single core residing in the P state. Assuming that core 1 in the X scanning chain is in state P, all other cores being in state N, the pulse from winding 21 will switch core 1 to state N not effecting any of the other cores. The voltage generated in the two secondary windings 32, 33 of core 1 will permit current to flow through the diodes 34, 35 respectively into the windings on the two adjacent cores. This current flow will induce in core 2 a switching action causing it to be switched to a P state. However, the ratio of turns in the circuitry connecting cores 1 and 0 is such that the switching of core 1 does not effect the state of core 0. As core 2 is switched, the voltage produced in its secondary windings 36, 37 is of a polarity completely blocked by the diodes 35, 38 in the circuitry of these windings. Therefore, switching of core 2 from an N to a P state has no effect upon adjacent cores. Thus, it may be seen that the pulse produced by winding 21 was effective in transferring the P condition from core 1 to core 2. Inducing a pulse in winding 29 will have a similar effect; this time, however, transferring the state P from core 2 to core 3. By using an even number of cores and connecting transfer winding 39 of the last core "101," to switching winding 40 of the first core, "0," the chain is made re-entrant and the stepping action will continue indefinitely. Placing an additional winding with a series diode on each of these cores, which winding is not shown in FIG. 2, and poling these windings and diodes the same as winding 33 and diode 35 provides a pulse each time a core is switched from a P to an N state, and this pulse will appear to step along the chain.

Figure 2:
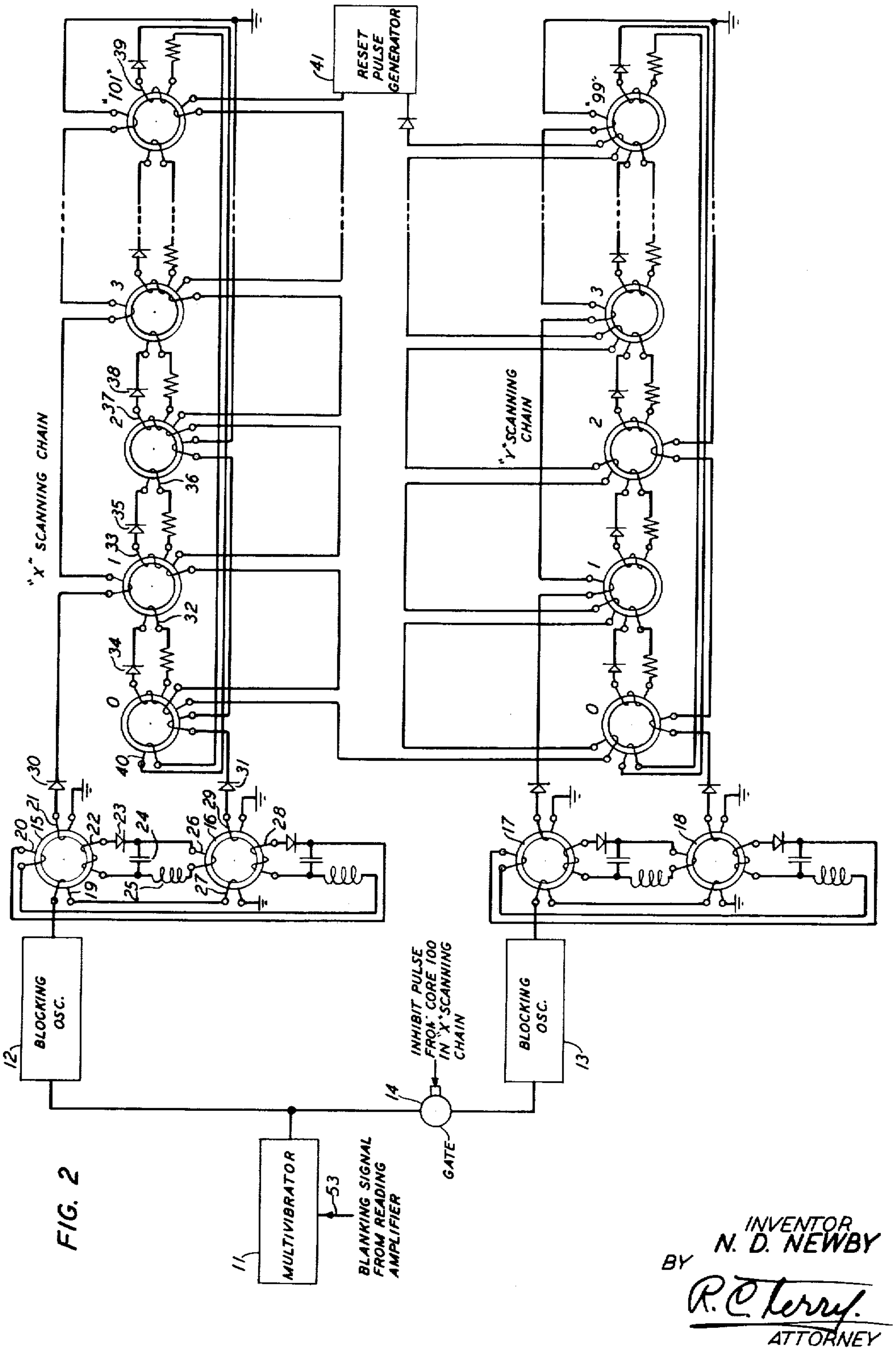
FIG. 2 is a circuit schematic showing the magnetic core scanning chains with control circuitry employed in each of the illustrative embodiments of this invention.

This invention utilizes these stepping pulses to perform the scanning operation. Since the pulses are being sepped simultaneously along the X and Y coordinates, the scanning is performed along diagonals. In order to completely scan the matrix, it is necessary after any diagonal scan for one chain to either make an additional step or skip a step in order to shift the scan to a different diagonal. In this invention this is accomplished by blocking a control pulse from the pulse generating source to the Y scanning chain by an inhibit pulse generated by the switching of core "100" in the X scanning chain. This inhibit pulse controls gate 14, shown in FIG. 2. It may be here noted that a two-fold need requies the use of still another core, "101," in the X scanning chain. First, to make the chain re-entrant an even number of cores is necessary, and second, as will be more apparent after the discussion of the coding-writing chains, it is necessary to reset all cores of these chains following each diagonal scan and core 101 is employed for this purpose. FIG. 2 further depicts the presence of reset pulse generator 41. Should there for any reason be a failure in the stepping action of the chains, the generator may be activated either manually or through failure detection circuitry to reset the chains so that one core, in this case core "0," will be placed in the P state while all others are placed in the N state.

While considering the operation of matrix scanning, it is well to note that the use of a magnetic core matrix in this invention makes it possible to conveniently ascertain when the entire group of circuits under surveillance has been completely scanned. By reserving the last core scanned, that is, not using it to register information, maintaining it in a P state al all times, and placing an output winding upon it, whenever that core is scanned a pulse will be induced in the output winding indicating completion of the scanning operation. This pulse may be used as a signal, to stop further scanning by controlling the pulse generator, to indicate the number of times the matrix is scanned, or to perform other desired operations.

The coding-writing chains 43, hereinbefore referred to, are employed to translate the information temporarily stored in the magnetic core matrix into a more permanent form. The present invention is demonstrated by three illustrative embodiments which employ different coding-writing chains. These three coding-writing chains have in common the fact that they are switched by pulses generated in the stepping or scanning chains and also the fact that they are all threaded by what will be known as coding-writing leads which terminate in the magnetic recording heads 50 associated with a magnetic tape recording device.

Figure 3:
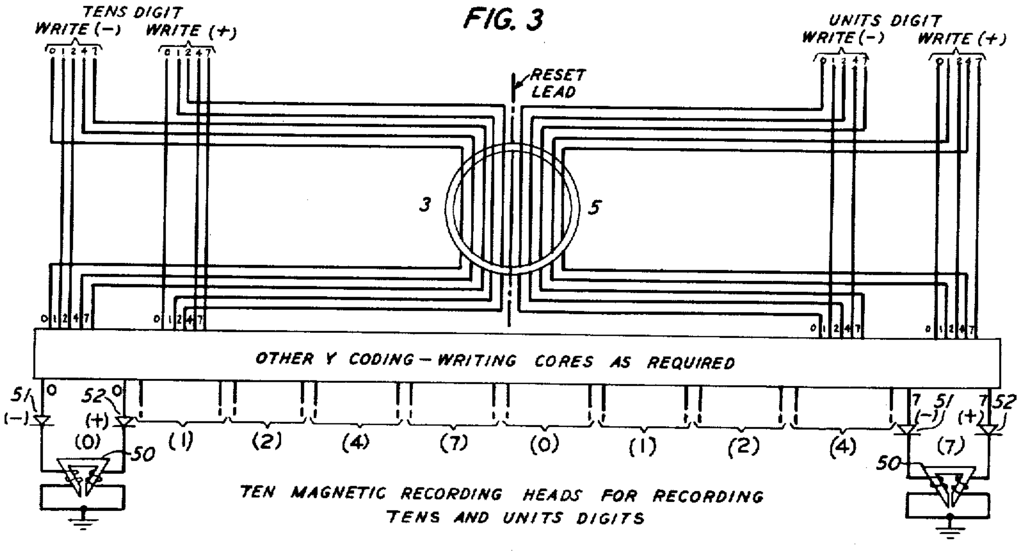
FIG. 3 illustrates the coding-writing lead arrangement with respect to a typical coding-writing magnetic core which is employed in several of the illustrative embodiments of the present invention and the connection of these leads to an illustrative permanent recording means.

FIG. 3 illustrates the unique means herein employed of encoding the address of the matrix cores for registration upon magnetic tape. A core, typical of those used in the coding-writing chains of several of the illustrative embodiments of the invention is therein depicted, along with the typical connection of coding-writing leads to magnetic recording heads. When the illustrated core is switched, it is assumed that the number 35 is to be written upon magnetic tape in a binary code fashion utilizing 2-out-of-5 representation. This 2-out-of-5 code is prepared by using two positive bits and three negative bits of information for each digit. Since this is the case, ten leads must be threaded through the core, five leads for digit 3 and five leads for digit 5. Obviously, in order to provide leads for all cores of a coding-writing chain, where a core may represent any number from 00 to 99, twenty leads must be available and these are shown in FIG. 3. Ten of these leads represent the units digit in a binary fashion and ten represent the tens digit. Considering for the moment only the ten leads associated with the units digit, it will be seen that five have been designated minus and five plus. The minus leads, after threading all appropriate cores in a coding-writing chain, pass through diodes 51 and are wound upon magnetic recording heads 50 in such a fashion as to induce a negative polarity upon the tape when energized. The corresponding plus leads similarly terminate after passing through diodes 52 upon the same magnetic recording head 50; however, these leads are wound upon the head to induce a positive polarity on the magnetic tape when energized.

As will be seen from FIG. 9, the digit 5 is represented by 01010. For the purpose of discussion, assume that the "1" state is that state represented by a positive polarization of the tape and that the "0" state is that state represented by a negative polarization of the tape. To write the digit 5 in binary fashion therefore, it is necessary to energize the negative leads corresponding to the first, third, and last bits and the positive leads corresponding to the second and fourth bits. In order to do this automatically with magnetic cores, the leads which are to be energized may be passed through predetermined cores so that when these cores are switched a pulse is induced in the leads and the magnetic heads at which they terminate will write on the tape the binary representation of the digit represented by the core. Thus, in FIG. 3 the digit 5 is produced by passing the negative leads corresponding to the first, third, and fifth bit and the positive leads corresponding to the second and fourth bit through the magnetic core; and the tens digit 3 is produced by passing the negative leads corresponding to the first, fourth, and fifth bits and the positive leads corresponding to the second and third bits through the magnetic core. The resultant information written upon the magnetic tape is the binary representation of the number 35 which is 0110001010. An analogous arrangement for the hundreds and thousands digits indicative of the column in which a matrix core resides makes possible the recording of the complete address of each matrix core as it is scanned.

Consider now the specific coding-writing chains employed in each of the three illustrative embodiments of the present invention. Several typical cores of the first chain are depicted in FIG. 5. Two separate coding-writing chains are employed, one responsive to the X scanning chain and the other responsive to the Y scanning chain. Each selecting lead threading a column or row of matrix cores also threads one core in its respective coding-writing chain. Therefore, there are one hundred magnetic cores in the X coding-writing chain and one hundred magnetic cores in the Y coding-writing chain. In addition to the scanning leads, each coding-writing core is threaded by a lead energized by core "101" in the X scanning chain. It will be recalled that the pulses produced by the scanning chains are equal in amplitude to one-half that required to switch any core of the matrix. The cores of the coding-writing chains are arranged to be switched by pulses of this "one-half" amplitude so that every time a column selecting lead is energized, the X coding-writing core associated with that column will receive sufficient energy to switch it, and when the energizing pulses of the X scanning chain have reached core "101," this core, whose secondary winding threads all coding-writing chain cores, will switch each of the coding-writing cores back to their original state. If it is assumed, therefore, that initially all coding-writing chain cores were in the N state, as each column or row is scanned the corresponding coding-writing core will be switched to P producing an output voltage on the leads threading that core, and upon completing a diagonal scan, core "101" will reset all coding-writing cores to N. A plurality of coding-writing leads, such as were discussed in connection with FIG. 3, are threaded through the appropriate cores in each chain so that upon switching from N to P, a pulse is induced in the leads which is used to energize the magnetic recording heads 50 of the permanent magnetic recording device 49, while voltages produced during reset are blocked by diodes 51, 52. As each matrix core is scanned, the coding-writing leads by virtue of the pulses induced in them by the switching of coding-writing cores energize the magnetic recording heads 50 to write the address of the scanned core. Because both positive and negative bits are impressed on an otherwise neutral tape, as each address is written the previous one is erased. However, when a matrix core has been set to a P state by its input winding the scanning procedure will switch it to the N state and in the process induce a pulse in the read-out lead 46. FIG. 1 shows that this pulse is amplified and used to drive a tape stepper 47 which responds to a pulse by translating the tape one step. The degree of movement in each step is that which is necessary to move any information written on the tape far enough away from the recording heads to prevent erasure by subsequent writings. The pulse appearing on the read-out lead 46, after amplification, is also used to momentarily stop the scanning operation. In this way, sufficient time is obtained to permit stepping of the tape without losing any information stored in the matrix. A simple means of performing this is by using the read-out pulse as a blanking signal. Connection between reading amplifier 45 and pulse generator 44 is shown by lead 53. Thus, when a matrix core has information stored in it, the scanning operation detects it, the coding-writing leads transmit the core designation to the tape, and the pulse induced in the read-out lead stops the scanning operation and then causes the tape to move a step before scanning resumes, thereby leaving the designation of the information storing core permanently impressed upon the magnetic tape. A permanent record of all the changes in state of circuits under surveillance by the register of this invention is thus obtained.

The second illustrative embodiment of this invention uses a somewhat different coding-writing arrangement, several typical cores of which are shown in FIG. 6. This arrangement utilizes only forty magnetic cores, twenty cores being required to encode the location of each row and the other twenty being used to encode the location of each column. A slightly different writing arrangement is also used which requires only five writing leads per core rather than the ten required in the foregoing embodiment. This is made possible by encoding only one digit per core rather than two digits. As will be apparent from a study of FIG. 6, which illustrates the wiring arrangements in this coding-writing circuit, each coding-writing core will have ten leads passing through it from the matrix. The units digits are encoded by ten cores and as shown in the figure, all row leads inductively coupled to rows whose designation has a 0 units digit will pass through the 0 coding core in the units group of the coding-writing chain. All row leads inductively coupled to rows having a units digit of 1 pass through the 1 core in the units group. In a similar fashion, all row leads inductively coupled to rows having a 0 tens digit will pass through the 0 core in the tens group. Using this system, therefore, as will be seen in the FIG. 6, the selecting lead coming from row 00 will pass through the 0 core of both the tens and units group and the selecting lead coming from row 29 will pass through the 2 core of the tens group and the 9 core of the units group. An additional difference occurs in the coding-writing circuit of this embodiment, in that all cores are subjected to a continuous bias of constant current +I. This amplitude of current is that which is essential to switch a core and therefore, in order to switch these cores from the P state in which they reside due to this current to the N state, it is necessary to supply a current of opposite polarity and of twice the amplitude or, of amplitude −2I. This is accomplished by adjusting the turns ratio of the selecting leads on the various magnetic cores so that the pulses produced in the scanning operation by the scanning chains are of sufficient amplitude to switch the coding-writing cores with which they are associated, while still requiring concurrence of row and column selecting leads to switch a matrix core. As in the case of the first illustrative embodiment, five of the ten code leads per digit thread a core so that as each row lead switches its coding-writing cores, the coding-writing leads threaded through these cores have pulses induced in them which control magnetic recording heads to write either a negative or a positive bit on the tape. The only difference as far as this portion of the operation is concerned, is that each digit of a core designation is supplied independently by a separate coding-writing core. Due to the constant +I bias, following switching by the scanning pulses, each core will reswitch back to P upon termination of the scanning pulse. The pulse induced in the writing lead by this reswitching action will not effect the magnetic recording heads 50 because the diodes 51, 52 associated therewith, as shown in FIG. 3, are back biased by such pulse. Here again, as discussed hereinbefore, when a matrix core is scanned which contains information, the pulse induced in the read-out winding will momentarily stop the scanning operation and translate the magnetic tape one step beyond the recording heads. Following the completion of this translation operation, scanning resumes as before and the designation of the core which had contained information is permanently impressed upon a magnetic tape.

FIG. 7 shows several typical cores of the coding-writing chain employed in the third illustrative embodiment of the invention. When utilizing this method, as with the first, one coding-writing core is required per coordinate lead. The 2-out-of-5 binary code is extracted from each core of the coding-writing chain in a similar manner although only four leads are threaded through each core out of a common group of ten leads. This reduction in writing leads is accomplished by using only signals representative of the positive bits of information.

When utilizing this coding-writing chain the tape is erased in any well-known fashion with a negative polarity. A further innovation when utilizing this illustrative embodiment is that signals are recorded on the tape only when a registration is encountered in the matrix.

All cores in the coding-writing chains of this third embodiment are initially in the N state and the windings thereon are so arranged that as each successive core is pulsed, the previous core will be subjected to a pulse switching it from state P to N. For example, assume that the scanning operation is in progress and that row 31 has just been scanned, hence core 31 is in state P. When row 32 is scanned, the pulse in selecting lead 32 will set core 32 to state P and reset core 31 to state N. A common lead 54 energized by the reading amplifier circuit is inductively coupled to each core of the coding-writing chains and when energized will reset all cores to state N. Such resetting will generate positive pulses in the coding-writing leads threaded through these cores. In operation, the pulse generator is stopped by the appearance of a pulse on read-out lead 53 and the common lead 54 just mentioned is energized switching the cores in state P to state N. These cores are the cores which identify the matrix core which had just previously been scanned. The switching of the coding-writing cores results in a positive pulse on the coding-writing leads which passes through a saturating reactor circuit shown in FIG. 8 to magnetic recording heads that record the address of the matrix core. There is such a saturating reactor connected in series with each coding-writing lead. As already mentioned, cores are continually being switched from the P to the N state as the scanning operation proceeds, and it is not desired to have these changes registered upon the magnetic tape. By employing a saturating reactor it is possible to have a device which exhibits sufficient reactance under normal operation to block switching pulses from the writing heads. However, when a registration is encountered in a matrix, the reading amplifier circuit transmits a pulse through additional windings 55 of the reactor, saturating it thereby lowering its impedance, and permitting the information pulses coming from the coding-writing chain to pass through the windings on the magnetic recording heads. It may be here noted that persons skilled in the art may readily envision other types of gates to perform a similar operation.

The registration of a plurality of states or conditions in a plurality of circuits may readily be accomplished in accordance with the teaching of the present invention. Assume for example that there are four conditions in each circuit that are to be detected and registered, state A (inactive), state B (connected in one way), state C (connected a second way), and state D (connected in both ways). The registration of these conditions may advantageously be accomplished by a simple modification of the matrix arrangement and registering equipment illustrated in FIG. 1. This modification includes the addition of one core at each crosspoint of the illustrated matrix. This core is threaded by the same row and column selecting leads as its companion and is therefore subjected to the same switching forces. The identification of which matrix crosspoint is being scanned is accomplished in an identical fashion to that above discussed; however, now two matrix cores are being scanned simultaneously. Separate input windings are inductively coupled to each matrix core, the windings to each pair of cores at a crosspoint emanating from a common circuit. Thus, when the circuit is inactive no core is set, when the circuit is connected in a first manner a pulse in one winding will set one core, when the circuit is connected in a second manner a pulse in the second winding will set the companion core, and when the circuit is concurrently connected in both manners pulses in both windings will set both cores. Two separate sensing leads are inductively coupled to the matrix cores, the first being coupled to the first core at every crosspoint and the second being coupled to the companion core at every crosspoint. Whenever a core is switched therefore, its location will be noted by the coding-writing chains, and the read-out lead upon which a pulse is induced will be an indication of the manner in which the circuit is connected. Each read-out lead is connected to a separate read-out amplifier in a manner similar to that shown in FIG. 1. An output of each of these amplifiers controls a common tape stepper so that whenever a pulse appears on either lead the tape is stepped. Another output from each of these amplifiers controls a common pulse generator momentarily stopping it whenever a pulse appears on either lead, thus halting scanning during the recording of the address of the matrix cores in the manner described above. Because, as assumed above, each circuit has four states it is further necessary to record on the recording medium which read-out lead has been activated. This may be accomplished when using a magnetic recording medium by the addition of an individual recording head controlled by each of the read-out leads. An example of the technique would be to impress a bit on the recording media whenever a pulse appears on either lead. These information bits could be physically located adjacent to the core designation recorded on the tape by the recording heads controlled by the coding-writing chains. Of course, any similar arrangement would be adequate.

It is worthy of note at this point that although the preceding paragraph deals with a register capable of registering four different states in a plurality of circuits, to extend this system to handle more states is merely a mechanical procedure utilizing the teaching herein contained.

To insure the correct operation of the registering systems above described, the operation of the combination of elements used may be conveniently checked with a minimum amount of effort. Since the core designations are imprinted upon a permanent medium, in the case of the illustrative embodiments this medium being magnetic tape, establishment of a fixed condition proves a very efficient means of checking. An operator is then able to investigate the tape for a previously arranged configuration of data. A simple and convenient test, for example, may be made by temporarily blocking the pulse generator and passing a current +I through the read-out lead thereby storing a signal in one-half of the matrix cores. This is a result of the winding arrangement of the read conductor which it will be recalled alternately threads each core of the matrix. When scanning is resumed, the directory number of all of the even cores will be written on the magnetic tape and the directory number of all odd numbered cores will be absent. In this way, one-half of the matrix cores may be investigated for proper operation and at the same time, it is also possible by varying the amplitude of the pulse applied to the read conductor to determine the marginal conditions of the cores. A similar test may be made of all odd numbered cores by passing a current pulse of the opposite polarity, amplitude —I, through the read-out lead.

There is also another test arrangement which will perhaps more closely resemble actual operation and therefore be more effective. In this arrangement, the row and column selecting leads would be independently pulsed with a +I current, scanning resumed, and the tape read to insure that all cores in the column pulsed have registered as having stored information.

The above-detailed description is merely an illustration of specific embodiments of the invention and it is not intended to limit the invention to these illustrative embodiments. Other arrangements may be devised by those skilled in the art without departing from the spirit and scope of this invention.

What is claimed is:

1. A register circuit comprising in combination an array of magnetic cores, each of said cores having a particular designation within said array, scanning means inductively coupled to said cores for scanning each of the cores of said array in a particular sequence by generating identification signals in accordance with said particular sequence, each of said particular designations of said cores being represented by a particular combination of said identification signals, and code means responsive to said identification signals for producing binary coded pulses distinctly representative of each of said particular designations of said cores within said array.

2. A register circuit in accordance with claim 1 in combination with recording means controlled by said code means for recording said distinctly representative coded pulses.

3. A register circuit comprising in combination, a plurality of magnetic cores, each of said cores having two polarities of remanent magnetization and each of said cores having a distinct identifying designation, setting means for setting said cores to a desired polarity of magnetization, scanning means inductively coupled to said cores for selectively scanning said cores, an output lead inductively coupled to said cores and adapted to have a current pulse thereon when any of said cores having a remanent magnetization of said desired polarity are scanned by said scanning means, code means controlled by said scanning means for producing code pulses representing the designation of said cores, and recording means controlled by said code means and the current pulses on said output lead for recording the identifying designation of each of said cores having a remanent magnetization of said desired polarity.

4. The combination of claim 3 in combination with means connected to said scanning means and responsive to said current pulses on said output lead for interrupting the scanning of said cores.

5. A register circuit comprising in combination, a plurality of magnetic cores, each of said cores having two possible polarities of remanent magnetization and each of said cores having a distinct identifying designation, individual setting means for setting each of said cores to a desired polarity of magnetization, scanning means inductively coupled to said cores for successively scanning each of said cores, a plurality of code leads, code means controlled by said scanning means for successively producing coded current pulses in said code leads representing the designation of each of said scanned cores, an output lead inductively coupled to said cores and adapted to have a current pulse thereon when any of said cores having a remanent magnetization of said desired polarity are scanned by said scanning means, and recording means responsive to said coded current pulses on said code leads and the current pulses on said output lead for recording the identifying designation of each of said cores having a remanent magnetization of said desired polarity.

6. The combination of claim 5 wherein said code means comprises a second plurality of magnetic cores inductively coupled to said scanning means and said code leads.

7. The combination of claim 5 wherein said recording means comprises in combination, a movable magnetizable medium, and means controlled by said coded current pulses on said code leads for recording on said medium coded representations corresponding to said identifying designations of each of said cores having a remanent magnetization of said desired polarity.

8. A register circuit comprising in combination, a plurality of magnetic cores having a substantially rectangular hysteresis curve characteristic, each of said cores having a distinct identifying designation, setting means for individually setting each of said cores to a magnetic saturation of a desired polarity, scanning means inductively coupled to said cores for successively scanning each of said cores, a plurality of code leads, magnetic core coding means controlled by said scanning means for selectively producing current pulses in said code leads in accordance with a predetermined code representing the designations of each of said cores, an output lead inductively coupled to said cores and adapted to have a current pulse thereon when any of said cores having a magnetic saturation of said desired polarity are scanned by said scanning means, a movable recording medium, a plurality of recording heads in proximity to a discrete area of said medium, said recording heads controlled by said current pulses in said code leads for recording in said discrete area a code representation corresponding to said identifying designation of each of said scanned cores, and means controlled by the current pulses on said output lead for moving said medium thereby removing said discrete area from the proximity of said recording heads.

9. The register circuit of claim 8 in combination with means connected to said scanning means and responsive to said current pulses on said output lead for interrupting the scanning of said cores.

10. A register circuit comprising in combination, a first plurality of magnetic cores arrayed in rows and columns, each of said cores having two polarities of remanent magnetization, input windings for each of said cores, setting means including said input windings for setting said cores to a first one of said two polarities of remanent magnetization, a plurality of row selecting leads each inductively coupled to a different row of said cores, a plurality of column selecting leads each inductively coupled to a different column of said cores, a pulse source, means for concurrently applying a current pulse from said pulse source to said row selecting leads and said column selecting leads to switch the cores defined thereby from said first polarity of remanent magnetization to the second polarity of remanent magnetization, a sensing lead inductively coupled to all of said cores and adapted to receive a current pulse from the ones of said cores switched from their first to their second polarity of remanent magnetization, magnetic core coding means inductively coupled to said row and said column selecting leads and actuated thereby for producing coded signals representative of each of said cores of said first plurality, and recording means controlled by said coded signals and the current pulses on said sensing lead for recording the representation of said cores set to said first polarity of remanent magnetization.

11. A register comprising in combination, a first plurality of magnetic cores arrayed in rows and columns, each of said cores having two polarities of remanent magnetization, and each of said cores having a distinct identifying designation, input windings for each of said cores, setting means including said input windings for setting said cores to a first of said two polarities of remanent magnetization, a plurality of row selecting leads each inductively coupled to a different row of said cores, a plurality of column selecting leads each inductively coupled to a different column of said cores, a pulse source, means for concurrently applying a current pulse from said pulse source to said row selecting leads and said column selecting leads to switch the cores defined thereby from said first polarity of remanent magnetization to a second polarity of remanent magnetization, a sensing lead inductively coupled to all of said cores and adapted to receive a current pulse from the ones of said cores switched from said first to said second polarity of remanent magnetization, a second plurality of magnetic cores inductively coupled to said row selecting leads and said column selecting leads in accordance with a predetermined code, each of said second plurality of cores switchable from a first polarity of remanent magnetization to a second polarity of remanent magnetization in response to the current pulse applied to the row or column selecting leads inductively coupled thereto, output means inductively coupled to said second plurality of cores and recording means controlled by said output means and the current pulses on said sensing lead for recording the identifying designation of the ones of said first plurality of cores set to said first polarity of remanent magnetization by said setting means.

12. A magnetic core register having a matrix memory comprising in combination, magnetic cores having a substantially rectangular hysteresis curve characteristic arrayed in rows and columns, each of said cores having a core designation comprising a plural digit number having row and column components indicative of the location of each core in said matrix, row and column selecting leads individually threading distinct rows and columns respectively of said magnetic cores, setting means for individually setting each of said cores to a magnetic saturation of one polarity, a sensing lead threading each of said cores and adapted to have a current pulse induced therein when any of said cores are switched from said one polarity to the other polarity of magnetic saturation, magnetic core coding means actuated by said row and column selecting leads for translating said core designation into a binary code, and recording means controlled by said coding means and the current pulses on said sensing lead for permanently recording the designation of said cores set to said one polarity of magentic saturation by said setting means.

13. A magnetic core register as defined in claim 12 wherein said magnetic core coding means utilizes magnetic cores having substantially rectangular hysteresis curve characteristics and comprises in combination, a first plurality of said magnetic cores each being threaded by a distinct one of said row selecting leads and switchable upon application of a current pulse to the row selecting lead threaded therethrough, a first plurality of writing leads selectively threading the cores of said first plurality of cores in accordance with a pattern based upon a binary code, the switching of the respective cores of said first plurality of cores inducing pulses in said first plurality of writing leads corresponding to the elements of said binary code and the digit represented by said elements corresponding to the row component of said core designation; a second plurality of said magnetic cores each being threaded by a distinct one of said column selecting leads and switchable upon application of a current pulse to the column selecting lead threaded therethrough, and a second plurality of writing leads selectively threading the cores of said second plurality of cores in accordance with said pattern based upon a binary code, the switching of the respective cores of said second plurality of cores inducing pulses in said second plurality of writing leads corresponding to the elements of said binary code and the digits represented by said elements corresponding to the column component of said core designation.

14. A magnetic core register as defined in claim 12 wherein said magnetic core coding means utilizes magnetic cores having substantially rectangular hysteresis curve characteristics and comprises in combination, a first pluality of said magnetic cores divided into groups of ten cores each, each of said groups of cores representative of one digit of the plural digit number used for said core designation, each of said row selecting leads threading one core in each of said groups of cores in a predetermined fashion and each of said cores being switchable upon application of a current pulse to the row selecting lead threaded therethrough, a first plurality of writing leads selectively threading the cores of said first plurality of cores in accordance with a pattern based upon a binary code, the switching of the respective cores of said first plurality of cores inducing pulses in said first plurality of writing leads corresponding to the elements of said binary code and the digits represented by said elements corresponding to the row component of said core designation; a second plurality of said magnetic cores divided into groups of ten cores each, each of said groups of cores representative of one digit of the plural digit number used for said core designation, each of said column selecting leads threading one core in each of said groups of cores in a predetermined fashion and each of said cores being switchable upon application of a current pulse to the column selecting lead threaded therethrough, a second plurality of writing leads selectively threading the cores of said second plurality of cores in accordance with said pattern based upon a binary code, the switching of the respective cores of said second plurality of cores inducing pulses in said second plurality of writing leads corresponding to the elements of said binary code and the digits represented by said elements corresponding to the column component of said core designation.

15. A magnetic core register as defined in claim 12 wherein said magnetic core coding means utilizes magnetic cores having substantially rectangular hysteresis curve characteristics and comprises in combination, a first plurality of said magnetic cores arranged in a series, each one of said cores threaded by a distinct one of said row selecting leads and switchable to one magnetic polarity upon application of a current pulse to said row selecting lead threaded therethrough, each of said distinct row selecting leads further threading the preceding core in said series of cores such that said preceding core is switchable to the other magnetic polarity upon application of said current pulse to said row selecting lead, a first plurality of writing leads selectively threading the cores of said first plurality of cores in accordance with a pattern based upon a binary code and adapted to have current pulses thereon when any of said cores are switched from said one magnetic polarity to said other magnetic polarity, the switching of the respective cores of said first plurality of cores inducing pulses in said first plurality of writing leads corresponding to the elements of said binary code and the digit represented by said elements corresponding to the row component of said core designation; a second plurality of said magnetic cores arranged in a series, each one of said cores threaded by a distinct one of said column selecting leads and switchable to one magnetic polarity upon application of a current pulse to said column selecting lead threaded therethrough, each of said distinct column selecting leads further threading the preceding core in said series of cores such that said preceding core is switchable to the other magnetic polarity upon application of said current pulse to said column selecting lead, and a second plurality of writing leads selectively threading the cores of said second plurality of cores in accordance with a pattern based upon said binary code and adapted to have a current pulse thereon when any of said cores are switched from said one magnetic polarity to said other magnetic polarity, the switching of the respective cores of said second plurality of cores inducing pulses in said second plurality of writing leads corresponding to the elements of said binary code and the digit represented by said elements corresponding to the column component of said core designation.

16. The magnetic core register defined in claim 15 in combination with a lead energized by the current pulses on said sensing lead and threading all cores of said first and said second plurality of cores for switching said cores from said one polarity of said other polarity.

17. A register circuit comprising in combination, a first plurality of magnetic cores arrayed in rows and columns, each of said cores having two polarities of remanent magnetization and each of said cores having a particular row and column designation comprising a plurality of elements, individual input windings for each of said cores, setting means including said input windings for setting said cores to a first of said two polarities of remanent magnetization, a plurality of row selecting leads each inductively coupled to a different row of said cores, a plurality of column selecting leads each inductively coupled to a different column of said cores, a pulse source, means for applying a current pulse from said pulse source to each of said row selecting leads in a predetermined sequence and for concurrently applying a current pulse to each of said column selecting leads in a predetermined sequence to successively switch the ones of said cores set to said first polarity of remanent magnetization to a second polarity of remanent magnetization, sensing means inductively coupled to all of said cores and adapted to receive a current pulse from the ones of said cores switched from said first to said second polarity of remanent magnetization; a second plurality of magnetic cores inductively coupled to said row selecting leads and said column selecting leads in accordance with a predetermined code, each core of said second plurality of cores switchable from a first polarity of remanent magnetization to a second polarity of remanent magnetization to a second polarity of remanent magnetization in response to the current pulse applied to the row or column selecting leads inductively coupled thereto, a plurality of code leads inductively coupled to said second plurality of cores in accordance with a 2-out-of-5 binary code whereby the switching of said second plurality of cores induces current pulses on predetermined ones of said code leads representative of the row and column designation of said first plurality of cores being scanned, and recording means controlled by said plurality of code leads and the current pulses in said sensing means for recording the designation of the ones of said first plurality of cores set to said first polarity of remanent magnetization by said setting means.

18. A register circuit as defined in claim 17 wherein said second plurality of magnetic cores comprises, a first series of magnetic cores each associated with a particular row of said first plurality of cores, each of said row selecting leads being inductively coupled to a particular core of said first series of cores, each of said cores of said first series of cores being switchable from said first to said second polarity of remanent magnetization upon the application of a said current pulse to the row selecting lead inductively coupled thereto, the switching of the cores of said first series of cores inducing current pulses in said plurality of code leads; a second series of magnetic cores each associated with a particular column of said first plurality of cores, each of said column selecting leads being inductively coupled to a particular core of said second series of cores, each of said cores of said second series of cores being switchable from said first to said second polarity of remanent magnetization upon the application of a current pulse to the column selecting lead inductively coupled thereto, the switching of the cores of said second series of cores inducing current pulses in said plurality of code leads.

19. A register circuit as defined in claim 17 wherein said second plurality of magnetic cores comprises a plurality of groups of cores, each of said groups representative of one element of said particular row and column desigation for each core of said first plurality of cores, each of said row and column selecting leads being inductively coupled to particular cores of said groups of cores in accordance with a pattern based upon said row and column designation, and wherein a bias means is inductively coupled to every core of said second plurality of cores to maintain said cores with a given polarity of remanent magnetization when not acted upon by current pulses in said row and column selecting leads.

20. A register circuit as defined in claim 17 wherein said second plurality of magnetic cores comprises, a first series of magnetic cores each associated with a particular row of said first plurality of cores, the row selecting lead inductively coupled to said particular row being inductively coupled to the associated core in said first series of magnetic cores such that a current pulse on said lead will set said associated core to said first polarity of remanent magnetization, each of said row selecting leads also inductively coupled to the preceding core in said first series of magnetic cores such that said current pulse will set said preceding core to said second polarity of remanent magnetization; a second series of magnetic cores each associated with a particular column of said first plurality of cores, the column selecting lead inductively coupled to said particular column being inductively coupled to the associated core in said second series of magnetic cores such that a current pulse on said lead will set said associated core to said first polarity of remanent magnetization, each of said column selecting leads also inductively coupled to the preceding core in said second series of magnetic cores such that said current will set said preceding core to said second polarity of remanent magnetization, and wherein said sensing lead is connected to a reading amplifier, said reading amplifier energizing a lead inductively coupled to each core of said first and said second series of magnetic cores for setting said cores to said second polarity of remanent magnetization upon appearance of the current pulses on said sensing lead.

21. A magnetic core register circuit as defined in claim 20 in combination with gating means controlled by the current pulses on said sensing lead for enabling said recording means.

22. A register circuit employing magnetic cores capable of residing in either of two states of magnetic polarity comprising in combination, a first plurality of said magnetic cores arrayed in rows and columns, each of said cores characterized by a particular decimal designation composed of the designations of the row and column in which said core resides, input windings for each of said cores, setting means including said input windings for setting said cores to one of said two states of magnetic polarity, a plurality of row selecting leads threading each row of said cores, a plurality of column selecting leads threading each column of cores, scanning means for applying a current pulse to a particular one of said row selecting leads and to a particular one of said column selecting leads to switch the magnetic polarity of the core defined by said leads from said one polarity to a second polarity when set to said one polarity by said setting means, a sensing lead threading the cores of said first plurality of magnetic cores and adapted to receive a current pulse when any of said cores is switched, a second plurality of said magnetic cores residing in an initial magnetic polarity, said row selecting leads threading particular ones of said second plurality of cores in accordance with a predetermined code, a third plurality of said magnetic cores residing in an initial magnetic polarity, said column selecting leads threading particular ones of said third plurality of cores in accordance with a predetermined code, each core of said second and said third plurality of cores switchable upon application of a current pulse to the selecting leads threaded therethrough, a first and second output means associated respectively with said second and third plurality of magnetic cores, a movable magnetizable surface, and a plurality of magnetic recording heads in proximity to a discrete area on said surface, said recording heads controlled by said first and said second output means for recording in said discrete area a coded representation corresponding to the particular decimal designation of each of said first plurality of cores.

23. A magnetic core register as defined in claim 22 wherein, each one of said second plurality of cores is threaded by a particular row selecting lead and is switchable upon application of a current pulse thereto, said first output means comprises a plurality of leads threading the cores of said second plurality of cores in accordance with a pattern based upon a 2-out-of-5 binary code, said leads adapted to receive current pulses whenever said cores of said second plurality of cores are switched, each one of said third plurality of cores is threaded by a particular column selecting lead and is switchable upon application of a current pulse thereto, and said second output means comprises a plurality of leads threading the cores of said third plurality of cores in accordance with said pattern based upon a 2-out-of-5 binary code, said leads adapted to receive current pulses whenever said cores of said third plurality of cores are switched.

24. The magnetic core register as claimed in claim 23 in combination with means controlled by the current pulses on said sensing lead for moving said magnetizable surface thereby removing said discrete area from the proximity of said recording heads, means connected to said scanning means and responsive to said current pulses on said sensing lead for interrupting the scanning of said first plurality of cores during the movement of said magnetizable surface, and means operable following the switching of all of said cores in said second and said third plurality of cores for reswitching said cores to said initial polarity.

25. A magnetic core register circuit as defined in claim 22 wherein, said second plurality of magnetic cores comprises two groups of ten cores each, the first of said groups representative of the units digit of the particular designation of said cores in said first plurality of cores and the second of said groups representative of the tens digit of said particular designation of said cores in said first plurality of cores, each core of said groups of cores representative of a distinct decimal digit, each of said row selecting leads threading the particular cores of each said groups representative respectively of the units and tens digit appearing in the row designation of the rows threaded by said row selecting leads, said cores switchable upon application of a current pulse to the row selecting lead threaded therethrough; said third plurality of magnetic cores comprises two groups of ten cores each the first of said groups representative of the hundreds digit of the particular designation of said cores in said first plurality of cores and the second of said groups representative of the thousands digit of said particular designation of said cores in said first plurality of cores, each core of said groups of cores representative of a distinct decimal digit, each of said column selecting leads threading the particular cores of each of said groups representative respectively of the hundreds and thousands digit appearing in the column designation of the columns threaded by said column selecting leads, said cores switchable upon application of a current pulse to the column selecting lead threaded therethrough.

26. A magnetic core register circuit as defined in claim 25 in combination with means controlled by the current pulses on said sensing lead for moving said magnetizable surface thereby removing said discrete area from the proximity of said recording heads, means connected to said scanning means and responsive to said current pulse on said sensing lead for interrupting the scanning of said first plurality of cores during the movement of said magnetizable surface, and means for maintaining said cores of said second and said third plurality of cores at said initial magnetic polarity except during said switching.

27. A magnetic core register circuit as defined in claim 25 wherein said first output means comprises a plurality of leads threading the cores of said second plurality of cores in accordance with a pattern based upon a 2-out-of-5 binary code, said leads adapted to receive current pulse whenever said cores of said second plurality of cores are switched, and said second output means comprises a plurality of leads threading the cores of said third plurality of cores in accordance with a pattern based upon a 2-out-of-5 binary code, said leads adapted to receive current pulses whenever said cores of said third plurality of cores are switched.

28. Translating means comprising, in combination, a plurality of magnetic cores capable of assuming bistable states of magnetic remanence, said plurality being divided into groups of ten cores each, each of said groups of cores representative of one digit of a plural digit number and each core of said groups of cores designated by a different decimal digit, leads having a designation comprising a plural digit number inductively coupled to a particular core in each said groups of cores in accordance with the digits of said designation, whereby energization of said leads causes switching of the cores coupled thereto, a first plurality of coding leads selectively threading the first group of said cores in accordance with the binary code representation of the designation of each core threaded, and a second plurality of coding leads selectively threading the second group of said cores in accordance with the binary code representation of the designation of each core threaded, the switching of each said cores inducing pulses in the coding leads threaded therethrough corresponding to the elements of said binary code and the decimal represented by said elements corresponding to said core designations.

29. An electrical circuit comprising in combination, an array of first magnetic cores, each of said cores having a particular decimal designation within said array, translating means comprising a plurality of serially-arranged second magnetic cores capable of assuming bistable states of magnetic remanence, each of said second cores also designated by a different decimal number, a plurality of leads designated by decimal numbers associated respectively with said cores of said array and threading the particular second cores having corresponding decimal designations, said cores being switchable to one magnetic polarity upon energization of the lead threaded therethrough, each of said leads further threading the preceding core of said serially-arranged second cores such that said preceding core is switchable to the other magnetic polarity upon energization of said lead, means for energizing said plurality of leads in accordance with particular decimal designations of the cores of said array, and a plurality of code leads selectively threading said second cores in accordance with a binary code representative of each second core's decimal designation, the number of coding leads threading each second core being less than the number of elements in said binary code, the switching of the respective cores of said plurality of second cores inducing pulses in said code leads corresponding to the elements of said binary code and the digit represented by said elements corresponding to the decimal designation of said first and said second cores.

30. An electrical circuit comprising in combination, an array of first magnetic cores, each of said cores having a particular decimal designation within said array, translating means comprising a plurality of serially-arranged second magnetic cores capable of assuming bistable states of magnetic remanence, each of said second cores also designated by a different decimal number, a plurality of leads designated by decimal numbers associated respectively with said cores of said array and inductively coupled to the particular second cores having corresponding decimal designations, said cores being switchable to one magnetic polarity upon energization of the lead coupled thereto, each of said leads being further inductively coupled to the preceding core of said serially-arranged second cores such that said preceding core is switchable to the other magnetic polarity upon energization of said lead, means for energizing said plurality of leads in accordance with particular decimal designations of the cores of said array, and a plurality of coding leads selectively inductively coupled to said second cores in accordance with a 2-out-of-5 binary code, the number of coding leads coupled to each second core being less than five, the switching of the respective cores of said plurality of second cores inducing pulses in said code leads corresponding to the elements of said binary code and the digit represented by said elements corresponding to the decimal designation of said first and said second cores.

31. A register for registering particular coded signals of a plurality of successively received coded signals comprising in combination, storage means, recording means responsive to each of said coded signals for successively storing the codes represented thereby in said storage means, clearing means including said recording means for succesively clearing the code stored in said storage means, and means operable in response to the reception of said particular coded signals for disabling said clearing means whereby the particular codes representing said particular coded signals remain stored in said storage means.

References Cited in the file of this patent

UNITED STATES PATENTS

| | | |
|---|---|---|
| 2,614,169 | Cohen et al. | Oct. 14, 1952 |
| 2,648,589 | Hickman | Aug. 11, 1953 |
| 2,702,380 | Brustman et al. | Feb. 15, 1955 |
| 2,719,965 | Person | Oct. 4, 1955 |
| 2,734,182 | Rajchman | Feb. 7, 1956 |
| 2,756,278 | Goshaw | July 24, 1956 |
| 2,773,444 | Whitney | Dec. 11, 1956 |
| 2,814,676 | House | Nov. 26, 1957 |
| 2,820,956 | Rueger | Jan. 21, 1958 |
| 2,876,294 | Wissman | Mar. 3, 1959 |
| 2,881,417 | Currey | Apr. 7, 1959 |
| 2,907,019 | Merlin | Sept. 29, 1959 |
| 2,920,312 | Gordon | Jan. 5, 1960 |
| 2,997,696 | Buckholz et al. | Aug. 21, 1961 |